United States Patent
Zhong

(10) Patent No.: US 10,900,523 B2
(45) Date of Patent: Jan. 26, 2021

(54) DOUBLE BUTTERFLY CAGE FOR A BALL BEARING AND METHOD OF FABRICATING A DOUBLE BUTTERFLY CAGE FOR A BALL BEARING

(71) Applicant: Schaeffler Technologies AG & Co. KG, Herzogenaurach (DE)

(72) Inventor: Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/454,430

(22) Filed: Jun. 27, 2019

(65) Prior Publication Data
US 2020/0408259 A1    Dec. 31, 2020

(51) Int. Cl.
| F16C 33/42 | (2006.01) |
| F16C 33/38 | (2006.01) |
| B21D 53/12 | (2006.01) |
| F16C 19/16 | (2006.01) |

(52) U.S. Cl.
CPC .......... *F16C 33/3887* (2013.01); *B21D 53/12* (2013.01); *F16C 19/16* (2013.01)

(58) Field of Classification Search
CPC .... F16C 19/06; F16C 33/3887; F16C 33/425; F16C 33/427; F16C 33/546
See application file for complete search history.

(56) References Cited

U.S. PATENT DOCUMENTS

| 1,195,313 | A | * | 8/1916 | Whitmer | F16C 33/425 |
| | | | | | 384/524 |
| 3,306,685 | A | * | 2/1967 | Bixby | F16C 33/425 |
| | | | | | 384/533 |
| 5,410,809 | A | * | 5/1995 | Alling | F16C 33/546 |
| | | | | | 29/412 |
| 2003/0021506 | A1 | | 1/2003 | Wilm et al. | |
| 2012/0207419 | A1 | * | 8/2012 | Fugel | F16C 33/425 |
| | | | | | 384/528 |

FOREIGN PATENT DOCUMENTS

| EP | 3225863 A1 | 10/2017 | |
| JP | 2601457 Y2 * | 11/1999 | ............ F16C 33/425 |
| JP | 2004332897 A * | 11/2004 | ............ F16C 19/10 |

* cited by examiner

*Primary Examiner* — Phillip A Johnson

(57) ABSTRACT

A cage for a ball bearing, including: a first annular flange; a second annular flange; a plurality of ball retention segments; and a plurality of spaces. Each ball retention segment includes: a first portion fixedly connected to the first annular flange; a second portion fixedly connected to the second annular flange; and, a middle portion connecting the first portion and the second portion. Each space is circumferentially bounded by a respective pair of circumferentially adjacent ball retention segments, and arranged to receive a ball of the ball bearing. A cross-section, including the first annular flange, the second annular flange, and a ball retention segment of the plurality of ball retention segments, is in a shape of an M.

13 Claims, 14 Drawing Sheets

US 10,900,523 B2

DOUBLE BUTTERFLY CAGE FOR A BALL BEARING AND METHOD OF FABRICATING A DOUBLE BUTTERFLY CAGE FOR A BALL BEARING

TECHNICAL FIELD

The present disclosure relates to a double butterfly cage for a ball bearing and a method of fabricating a double butterfly cage for a ball bearing. Butterfly wings of the cage provide outer retention for balls disposed in the cage.

BACKGROUND

It is known to use a riveted cage or plastic cage for ball bearings for high temperature and/or high speed applications.

SUMMARY

According to aspects illustrated herein, there is provided a cage for a ball bearing, including: a first annular flange; a second annular flange; a plurality of ball retention segments; and a plurality of spaces. Each ball retention segment includes: a first portion fixedly connected to the first annular flange; a second portion fixedly connected to the second annular flange; and, a middle portion connecting the first portion and the second portion. Each space is circumferentially bounded by a respective pair of circumferentially adjacent ball retention segments, and arranged to receive a ball of the ball bearing. A cross-section, including the first annular flange, the second annular flange, and a ball retention segment of the plurality of ball retention segments, is in a shape of an M.

According to aspects illustrated herein, there is provided a method of fabricating a cage of a ball bearing, including: profiling a rectangular strip of steel to form in a cross-section orthogonal to a longitudinal axis of the rectangular strip of steel a first flange parallel to the longitudinal axis of the rectangular strip of steel and including a first longitudinal edge of the rectangular strip of steel, a second flange parallel to the first flange and including a second longitudinal edge of the rectangular strip of steel, and a slot running from a first longitudinal end of the rectangular strip of steel to a second longitudinal end of the rectangular strip of steel, opposite the first longitudinal end; stamping the profiled rectangular strip of steel to create a plurality of ball retention segments and a plurality of spaces alternating with the plurality of retention segments in a first longitudinal direction parallel to the longitudinal axis, each ball retention segment disposed, in a first direction, orthogonal to the longitudinal axis, between the first flange and the second flange and connecting the first flange to the second flange; rolling the profiled stamped rectangular strip of steel into an annular shape; and fixedly connecting the first longitudinal end to the second longitudinal end.

According to aspects illustrated herein, there is provided a cage for a ball bearing, including: a first annular flange forming a portion of the cage extending furthest in a first axial direction parallel to an axis of rotation of the cage; a second annular flange forming a portion of the cage extending furthest in a second axial direction, opposite the first axial direction; and a plurality of ball retention segments. Each ball retention segment includes: a first portion fixedly connected to the first annular flange and including a surface facing partly radially outwardly from the axis of rotation and facing partly in the second axial direction; a second portion fixedly connected to the second annular flange and including a surface facing partly radially outwardly from the axis of rotation and facing partly in the first axial direction; and a middle portion connecting the first portion and the second portion and including a surface facing radially outwardly and connecting the surface of the first portion and the surface of the second portion. The first annular flange, a first gap, the first portion, a second gap, the second portion, a third gap, and the second annular flange are sequentially aligned in the second axial direction; or a line, in the second axial direction passes through in sequence the first annular flange, a first gap, the first portion, a second gap, the second portion, a third gap, and the second annular flange.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
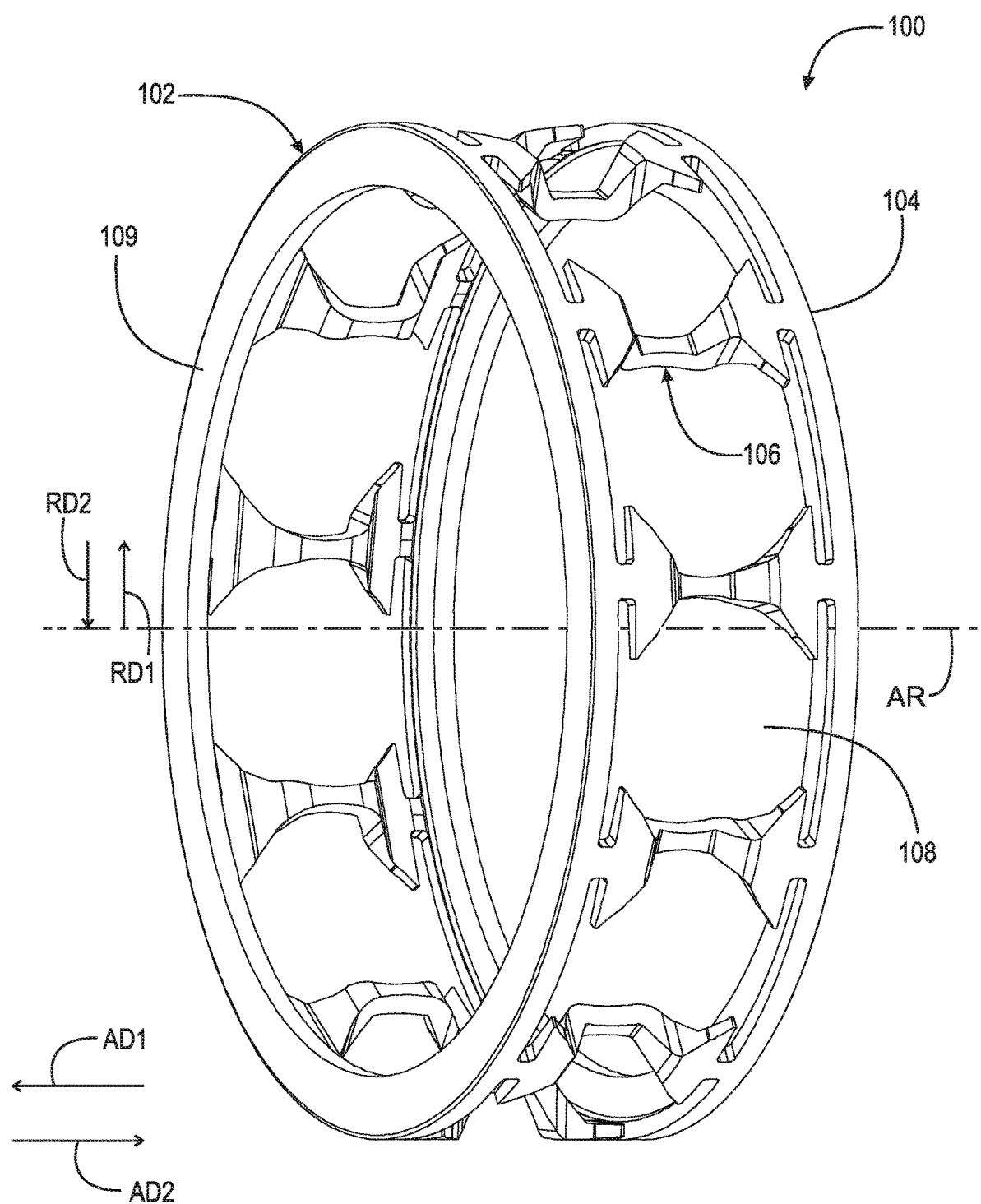
FIG. 1 is an isometric view of a double butterfly cage for a ball bearing.

FIG. 1 is an isometric view of double butterfly cage 100 for a ball bearing.

Figure 2:
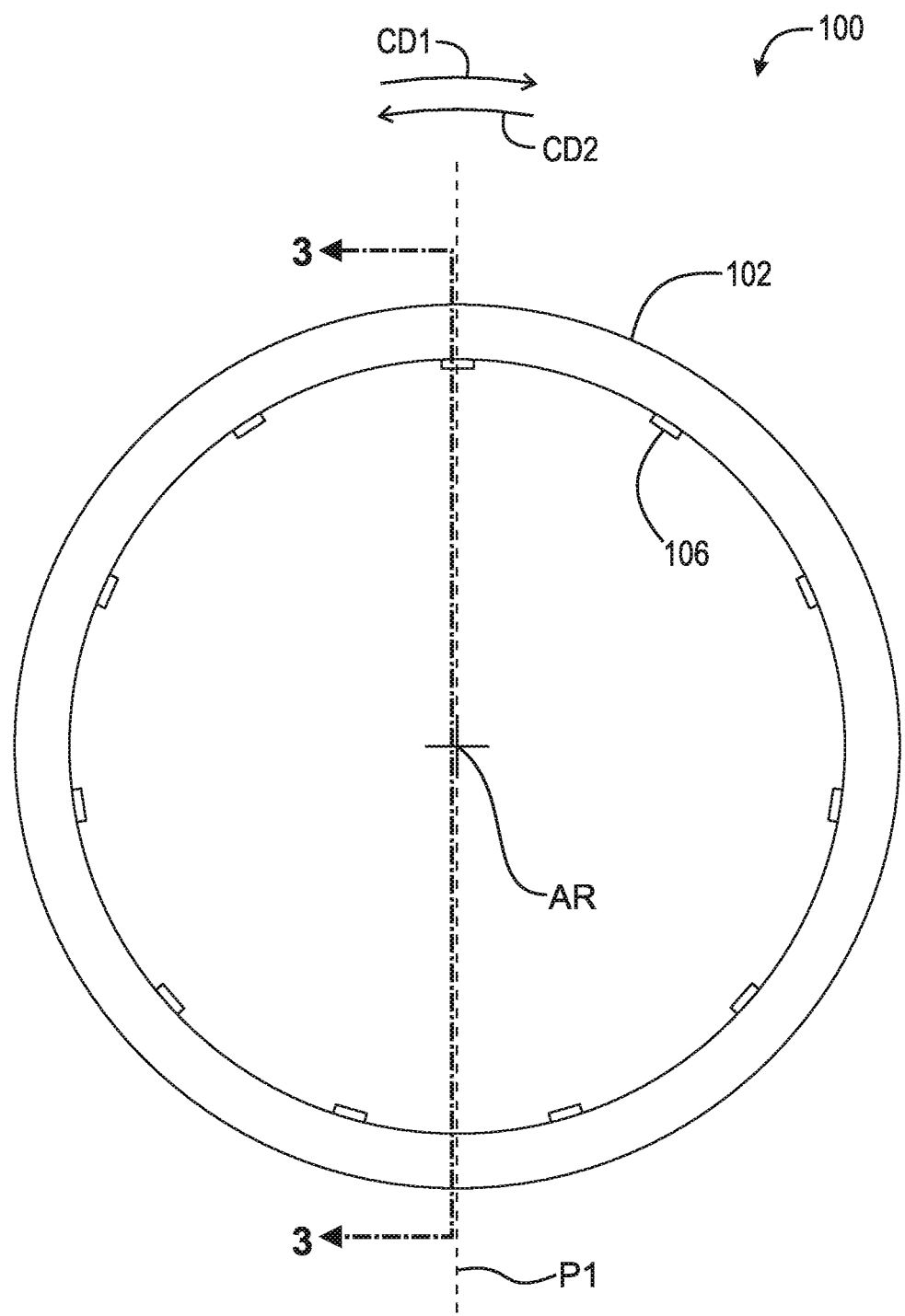
FIG. 2 is a front view of the double butterfly cage shown in FIG. 1.

FIG. 2 is a front view of double butterfly cage 100 shown in FIG. 1.

Figure 3:
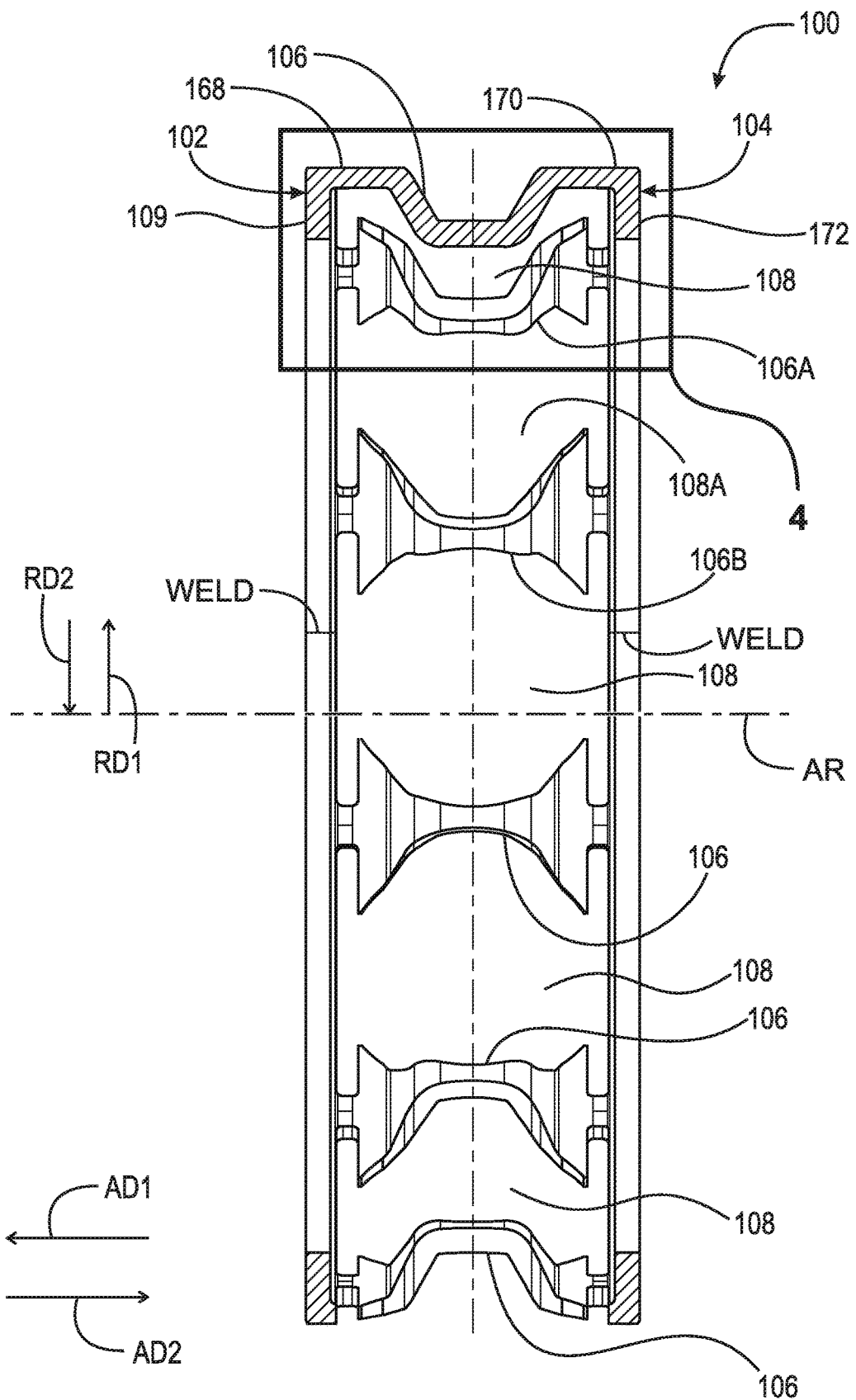
FIG. 3 is a cross-sectional view generally along line 3-3 in FIG. 2.

FIG. 3 is a cross-sectional view generally along line 3-3 in FIG. 2. The following should be viewed in light of FIGS. 1 through 3. Double butterfly cage 100 includes: annular flange 102; annular flange 104; and ball retention segments 106; and spaces 108. Annular flange 102 is continuous in opposite circumferential directions CD1 and CD2 about an axis of rotation AR of cage 100, and includes surface 109 forming the portion of cage 100 extending furthest in axial direction AD1. Annular flange 104 is continuous in opposite circumferential directions CD1 and CD2, and forms the portions of cage 100 extending furthest in axial direction AD2. Directions AD1 and AD2 are parallel to axis of rotation AR of cage 100 and opposite each other. A circumferential direction is illustrated by an end point of a radius rotated around axis AR.

Figure 4:
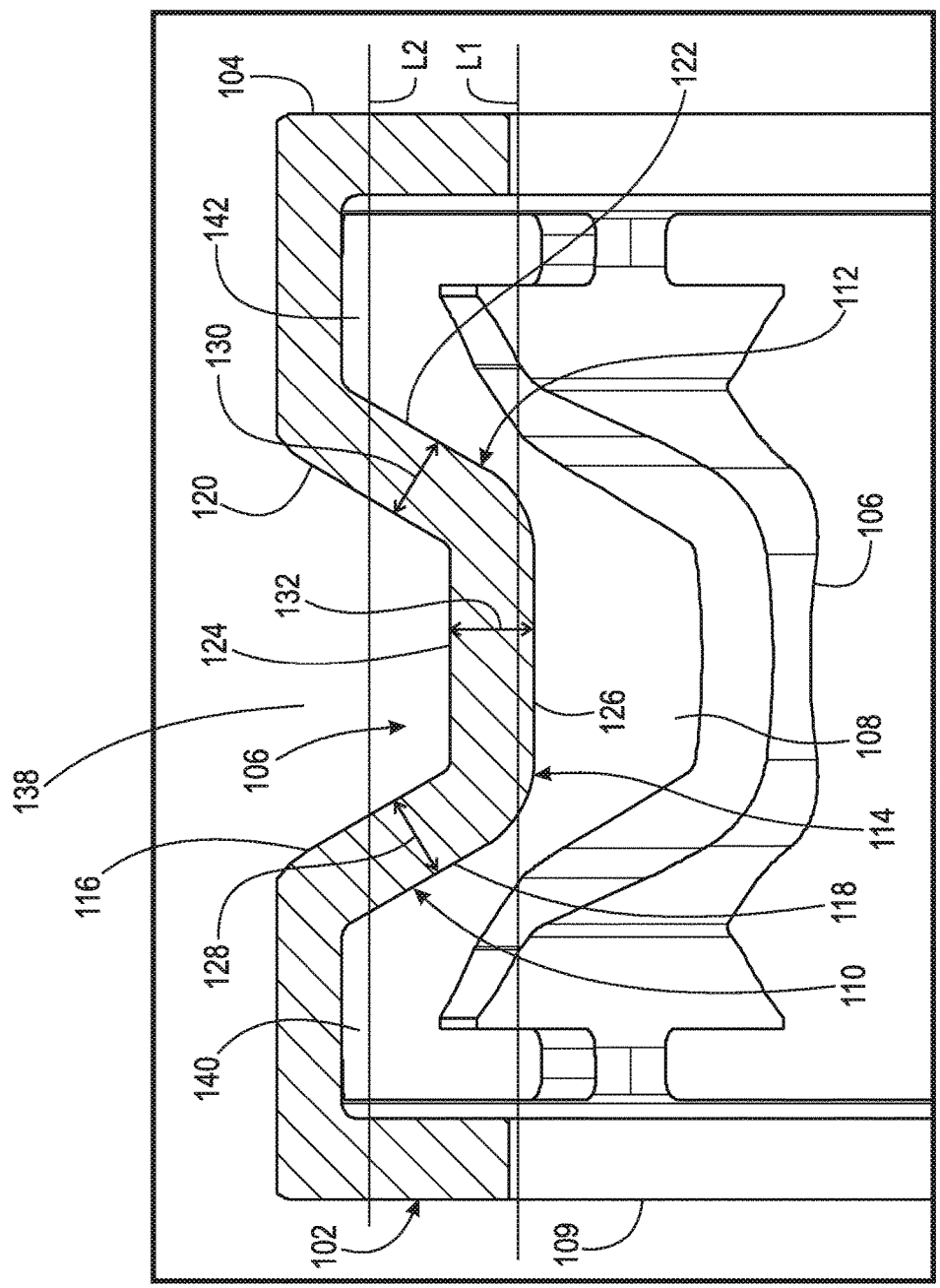
FIG. 4 is a detail of area 4 in FIG. 3.

FIG. 4 is a detail of area 4 in FIG. 3.

Figure 5:
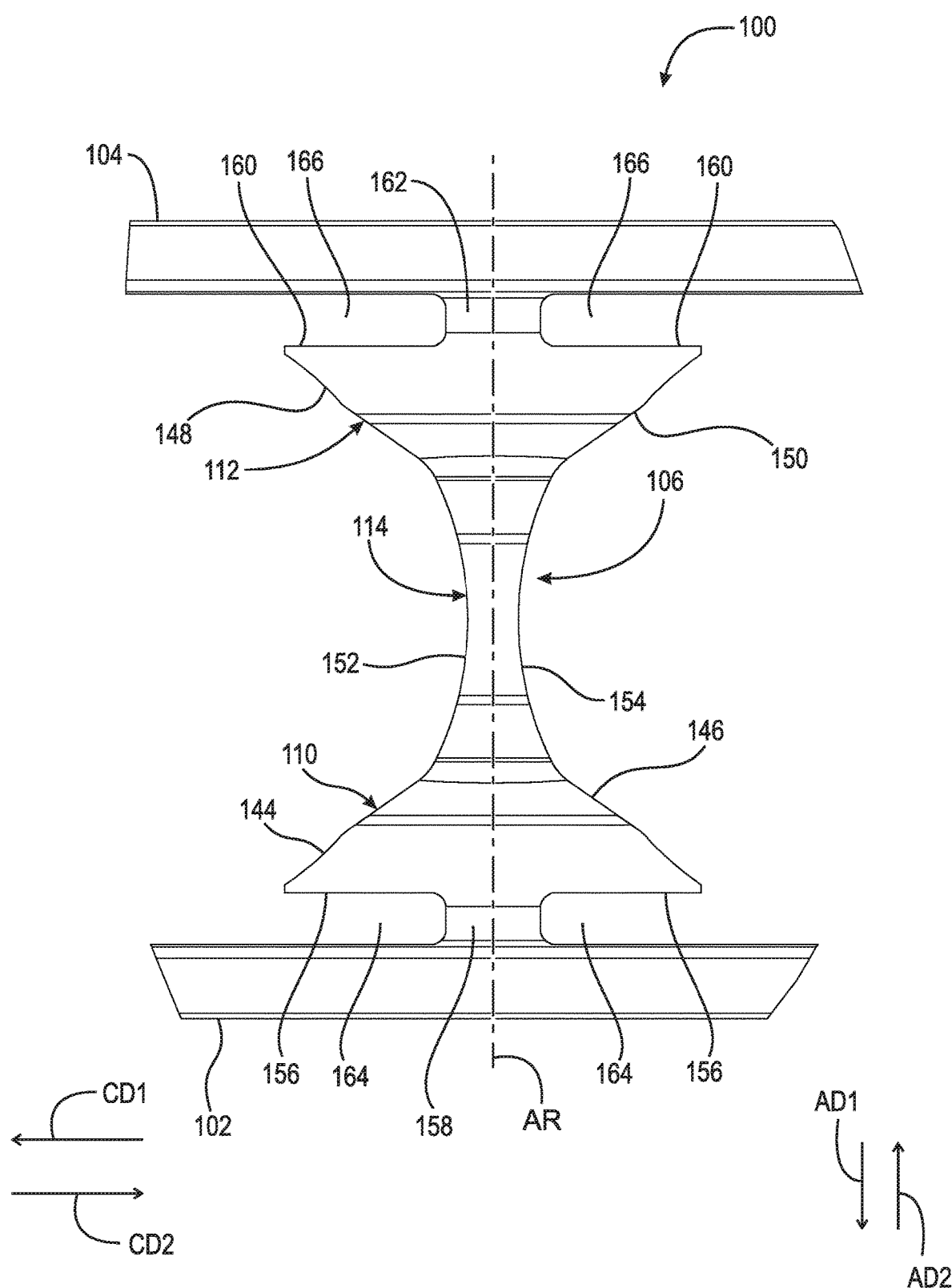
FIG. 5 is a detail of a ball retention segment shown in FIG. 1.

FIG. 5 is a detail of a ball retention segment 106 shown in FIG. 1. The following should be viewed in light of FIGS. 1 through 5. Each ball retention segment 106 includes: portion 110 fixedly connected to annular flange 102; portion 112 fixedly connected to annular flange 104; and middle portion 114 connecting portion 110 and portion 112. Each space 108 is: circumferentially bounded by a respective pair of circumferentially adjacent ball retention segments 106; and arranged to receive a ball (shown in figures below) of a ball bearing (shown in figures below). For example, space 108A is bounded in opposite circumferential directions CD1 and CD2 by segments 106A and 106B, respectively. In general, a reference character "[number][number] [number][letter]" designates a specific example of an element labeled as "[number][number][number]." For example, segment 106A is a specific example from among segments 106.

The cross-section shown in FIG. 3, including annular flange 102, annular flange 104, and a ball retention segments 106, is in a shape of an M, as further discussed below. The cross-section shown in FIG. 3 is formed by plane P1 co-linear with section line 3-3, co-linear with axis of rotation AR, and orthogonal to axis of rotation AR.

Each portion 110 includes surface 116 and surface 118. Each portion 112 includes surface 120 and surface 122. Each portion 114 includes surface 124 and surface 126. Surface 116 faces: partly radially outwardly from axis of rotation AR in radially outer direction RD1; and partly in axial direction AD2. Surface 118 faces: partly radially inwardly toward axis of rotation AR in radially inner direction RD2; and partly in axial direction AD1. Surface 120 faces: partly in radially outer direction RD1; and partly in axial direction AD1. Surface 122 faces: partly in radially inner direction RD2; and partly in axial direction AD2.

Surface 124 faces at least partly in radially outer direction RD1 and connects surface 116 and surface 120. Surface 126 faces at least partly in radially inner direction RD2 and connects surface 118 and surface 122. In an example embodiment, thickness 128 of portion 110, thickness 130 of portion 112, and thickness 132 of portion 114 are equal to each other. That is, portions 110, portions 112, and portions 114 have a same thickness. In an example embodiment, at least part of portions 114 extend past flange 102 and flange 104 in direction RD2. For example, in FIG. 4, line L, parallel to axis AR in direction AD1 passes through a portion 114 and is radially inward of flanges 102 and 104.

Each segment 106 includes slot 138: bounded in axial direction AD1 by portion 110; bounded in axial direction AD2 by portion 112; bounded in direction RD2 by middle portion 114; and open in directions RD1, CD1, and CD2. Annular flange 102 and portions 110 are separated by gaps 140 in direction AD2. Portions 112 and annular flange 104 are separated by gaps 142 in direction AD2. Therefore, annular flange 102, gaps 140, portions 110, slots 138, portions 112, gaps 142, and annular flange 104 are sequentially aligned in axial direction AD2. For example, in FIG. 4, line L2, in direction AD2, passes through in sequence: annular flange 102, gap 140, portion 110, slot 138, portion 112, gap 142, and annular flange 104.

Regarding the M-profile of cage 100 as seen in FIG. 3: annular flange 102 forms one vertical leg; annular flange 104 forms the other vertical leg; portion 110 forms one slanted leg; and portion 112 forms the other slanted leg.

Each portion 110 includes edge 144 and edge 146. Each portion 112 includes edge 148 and edge 150. Each middle portion 114 includes: edge 152 connecting edges 144 and 148; and edge 154 connecting edges 146 and 150. Edge 144 slopes away from annular flange 102 in circumferential direction CD2 along axial direction AD2. Edge 146 slopes away from annular flange 102 in circumferential direction CD1 along axial direction AD2. Edge 148 slopes away from annular flange 104 in circumferential direction CD2 along axial direction AD1. Edge 150 slopes away from annular flange 104 in circumferential direction CD1 along axial direction AD1.

In an example embodiment: each portion 110 includes surfaces 156 and neck 158; each portion 112 includes surfaces 160 and neck 162; and cage 100 includes relief notches 164 and 166. Surfaces 156 face flange 102 in direction AD1 and are separated from flange 102 by respective notches 164. Thus, notches 164 are bounded by flange 102, necks 158, and surfaces 156. Surfaces 160 face flange 104 in direction AD2 and are separated from flange 104 by respective notches 166. Thus, notches 166 are bounded by flange 104, necks 162, and surfaces 160. As further described below, notches 164 and 166 enable formation of cage 100 while minimizing distortion of flanges 102 and 104 and segments 106.

Figure 6:
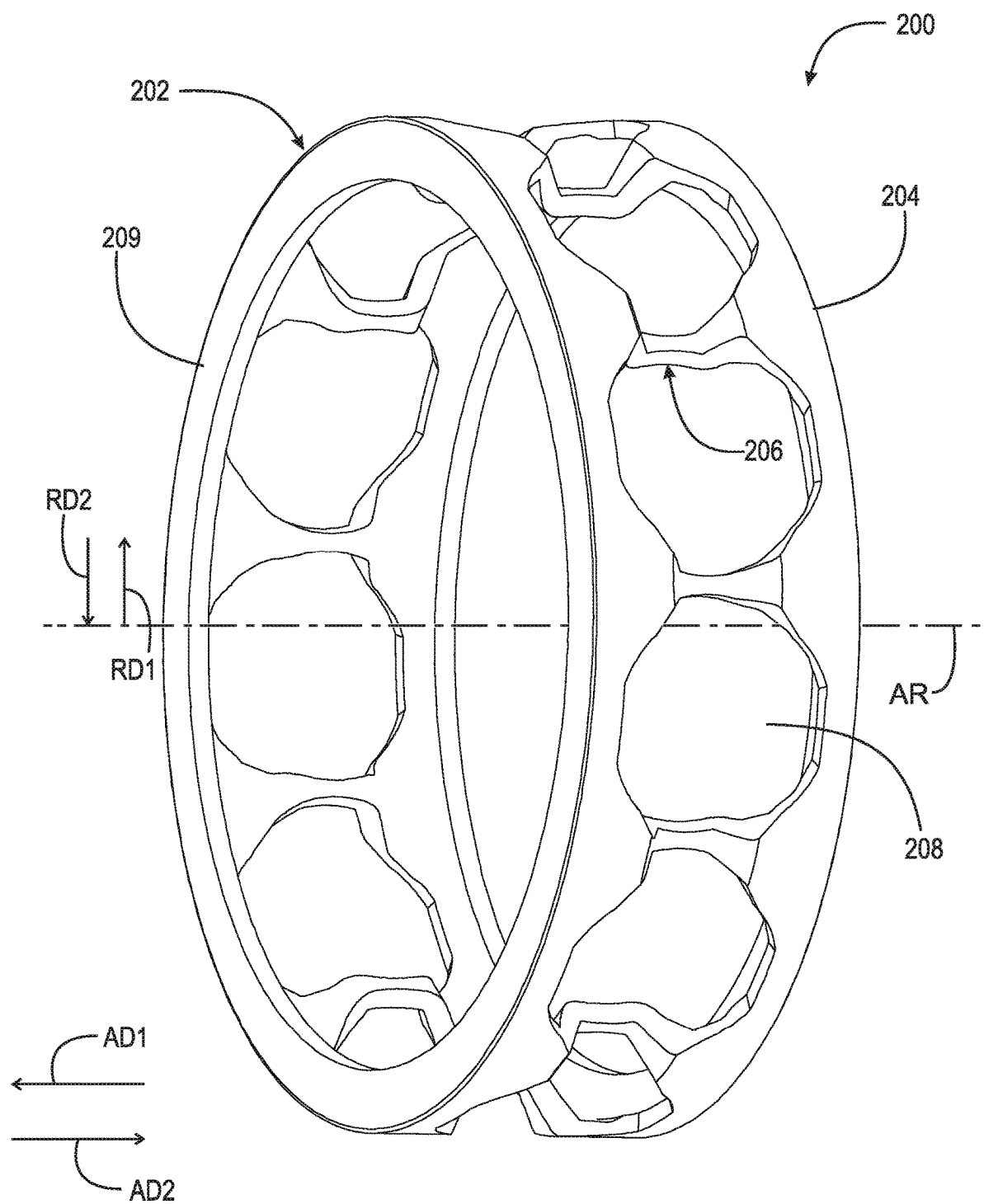
FIG. 6 is an isometric view of a double butterfly cage for a ball bearing.

FIG. 6 is an isometric view of double butterfly cage 200 for a ball bearing.

Figure 7:
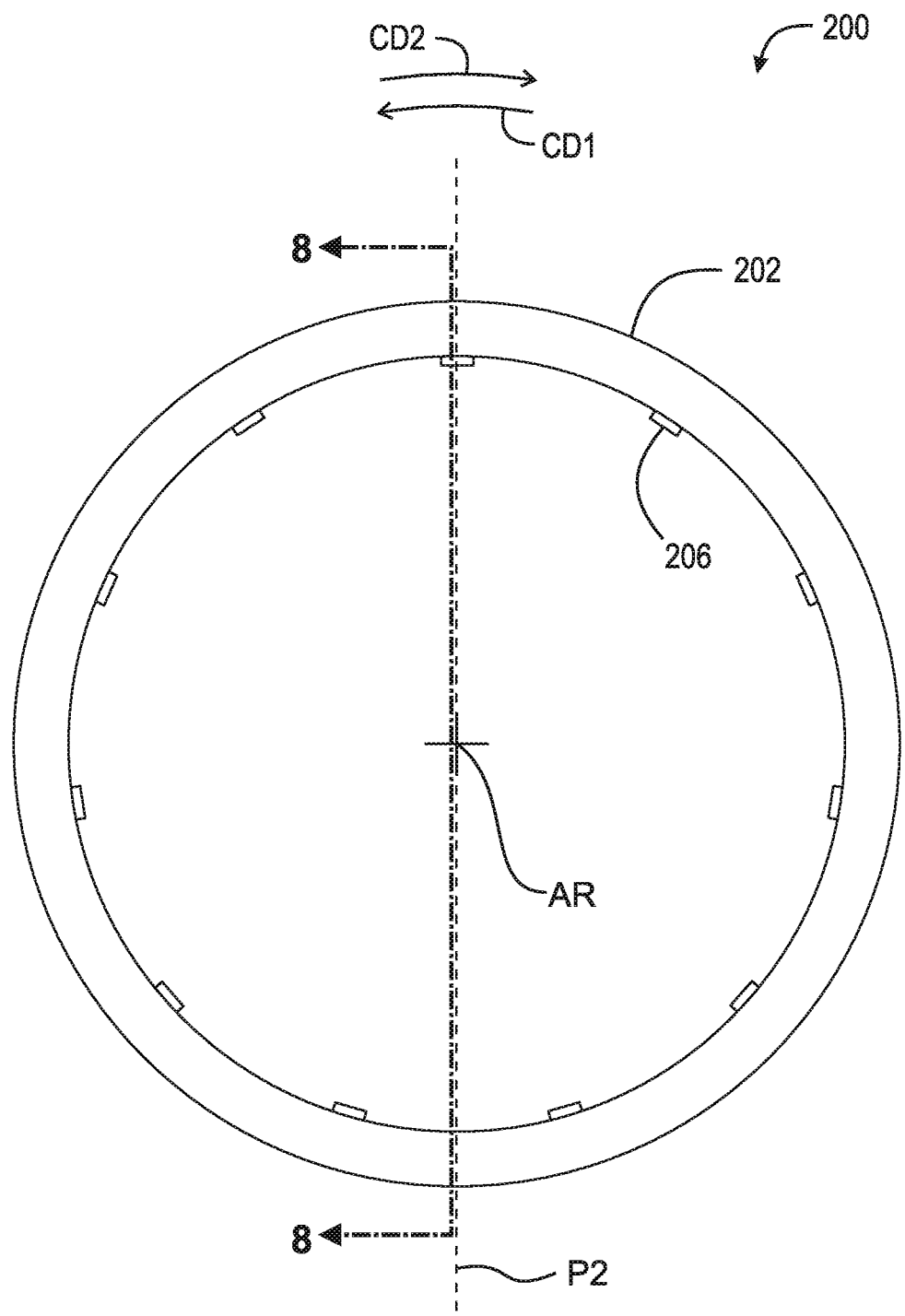
FIG. 7 is a front view of the double butterfly cage shown in FIG. 6.

FIG. 7 is a front view of double butterfly cage 200 shown in FIG. 6.

Figure 8:
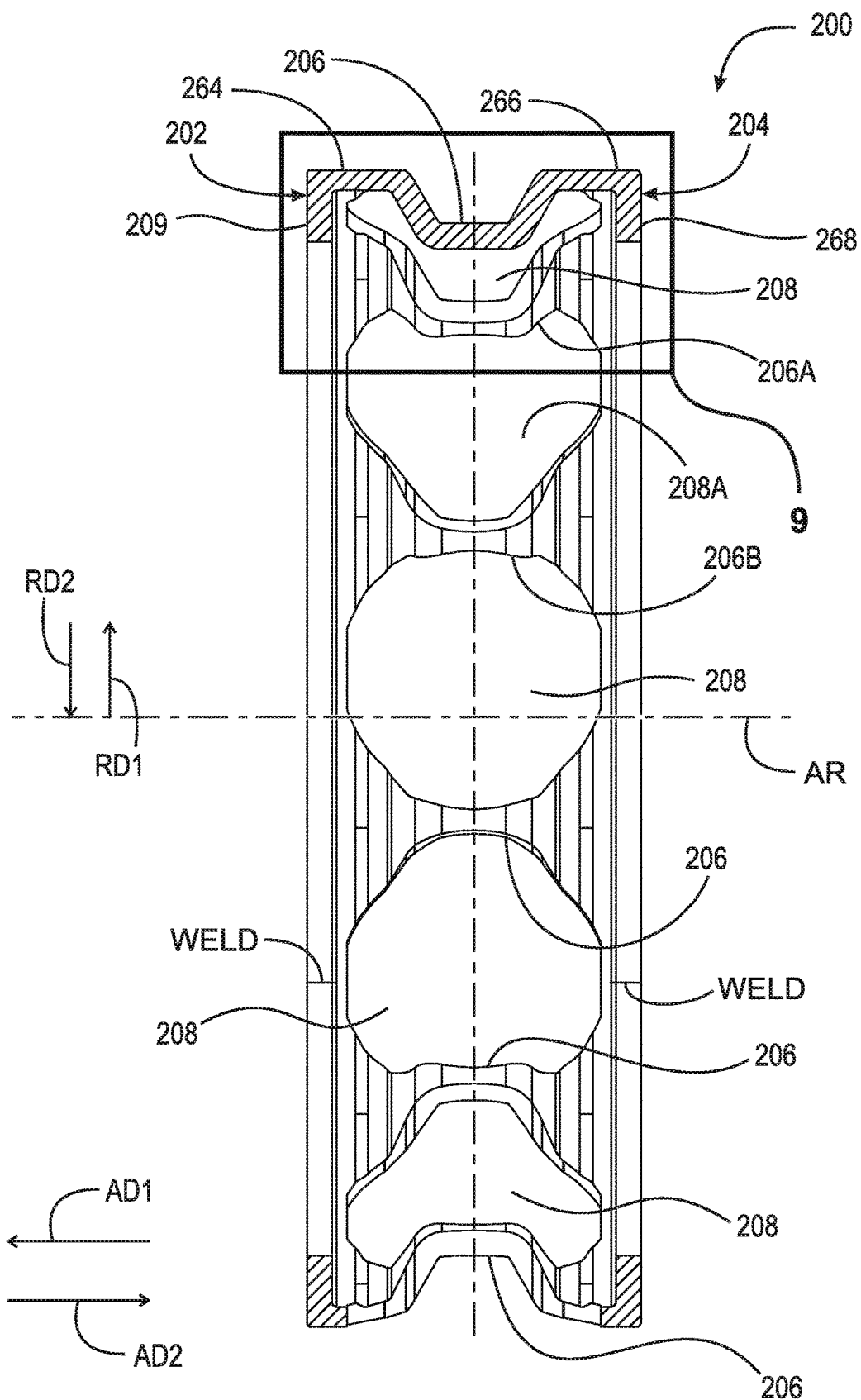
FIG. 8 is a cross-sectional view generally along line 8-8 in FIG. 7.

FIG. 8 is a cross-sectional view generally along line 8-8 in FIG. 7. The following should be viewed in light of FIGS. 6 through 8. Double butterfly cage 200 includes: annular flange 202; annular flange 204; and ball retention segments 206; and spaces 208. Annular flange 202 is continuous in opposite circumferential directions CD1 and CD2 about an axis of rotation AR of cage 200, and includes surface 209 forming the portion of cage 200 extending furthest in axial direction AD1. Annular flange 204 is continuous in opposite circumferential directions CD1 and CD2, and forms the portions of cage 200 extending furthest in axial direction AD2. Directions AD1 and AD2 are parallel to axis of rotation AR of cage 200 and opposite each other.

Figure 9:
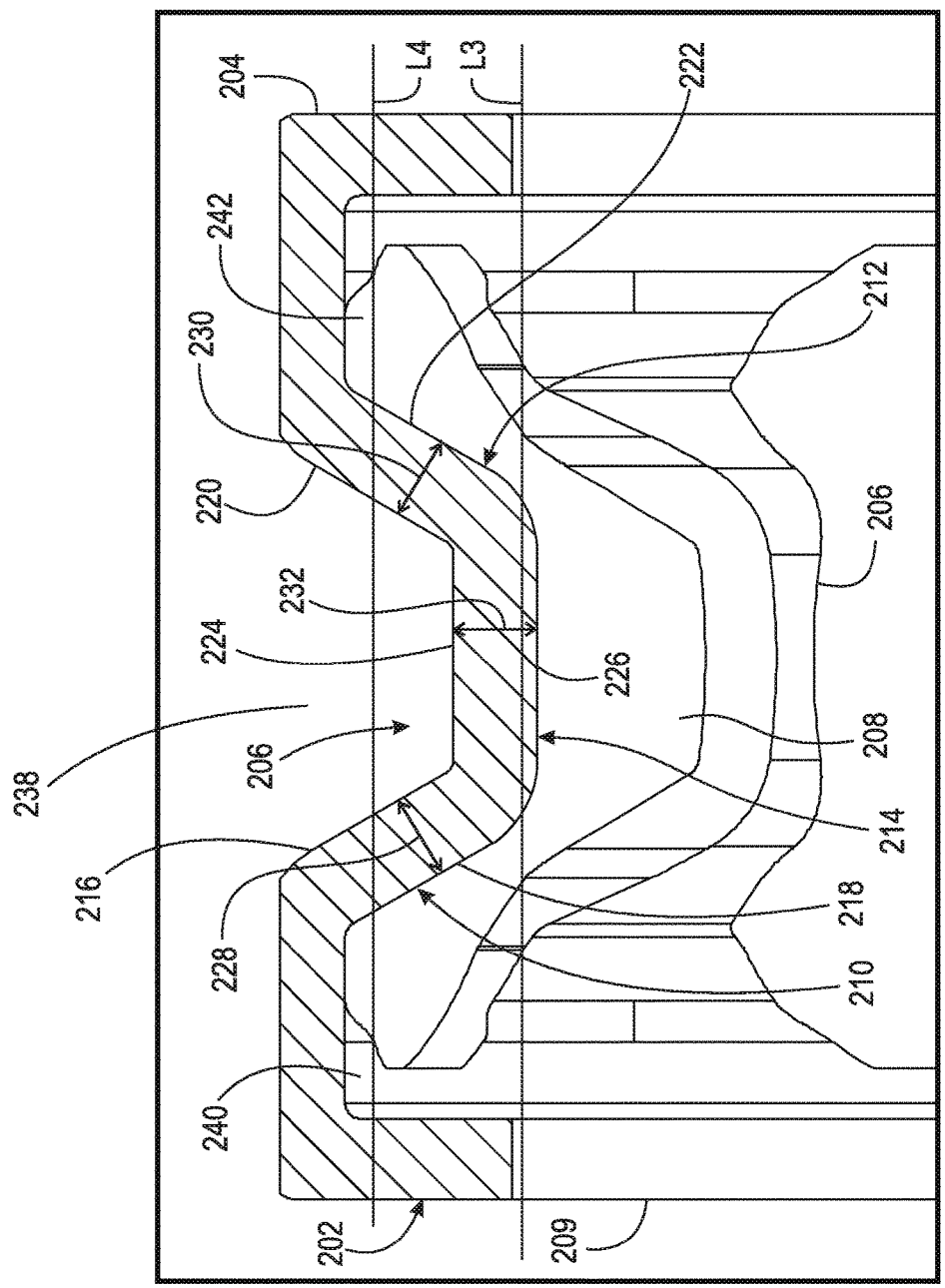
FIG. 9 is a detail of area 9 in FIG. 8.

FIG. 9 is a detail of area 9 in FIG. 8.

Figure 10:
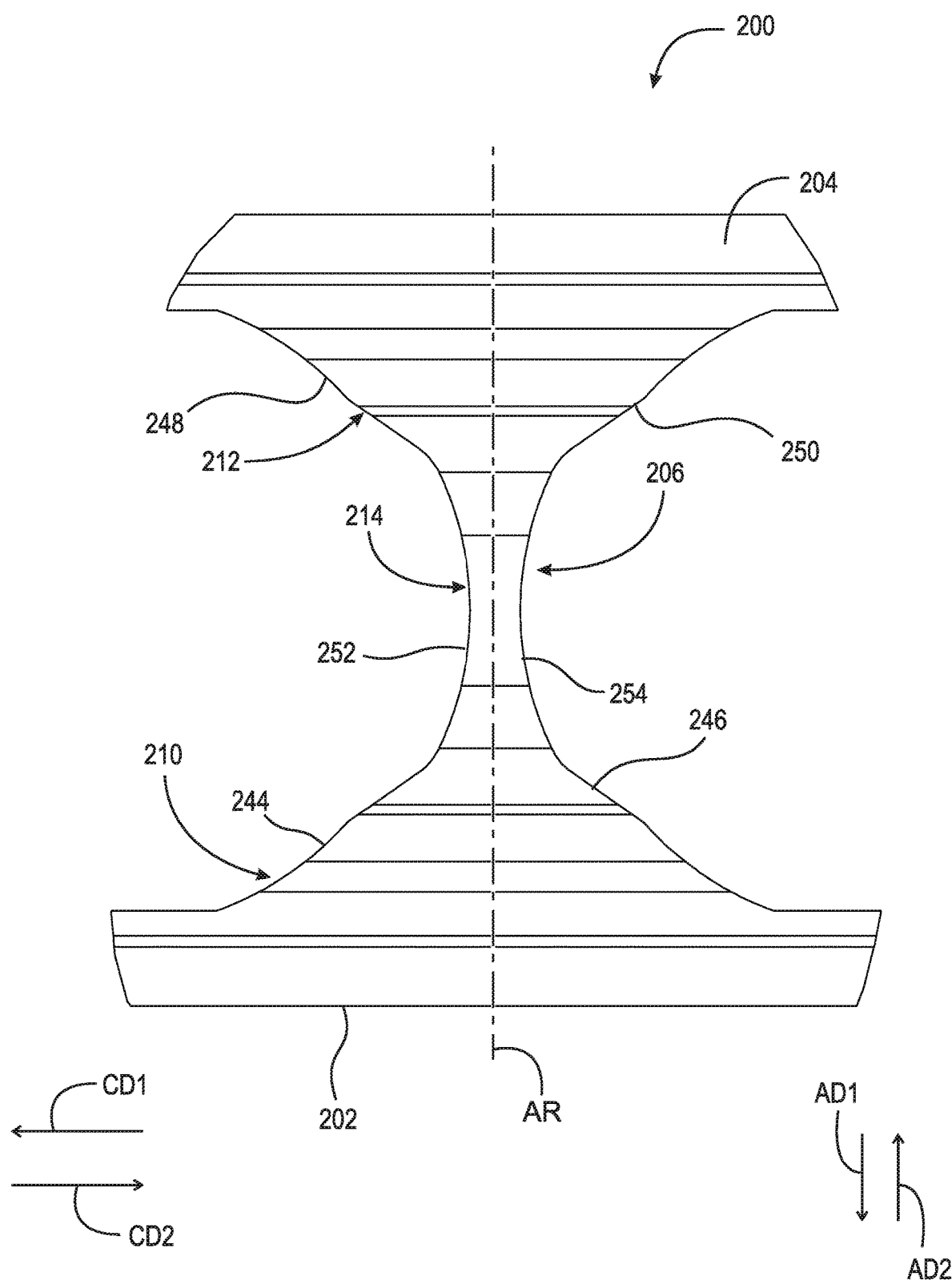
FIG. 10 is a detail of a ball retention segment shown in FIG. 6.

FIG. 10 is a detail of a ball retention segment 206 shown in FIG. 6. The following should be viewed in light of FIGS. 6 through 10. Each ball retention segment 206 includes:

portion 210 fixedly connected to annular flange 202; portion 212 fixedly connected to annular flange 204; and middle portion 214 connecting portion 210 and portion 212. Each space 208 is: circumferentially bounded by a respective pair of circumferentially adjacent ball retention segments 206; and arranged to receive a ball (shown in figures below) of a ball bearing (shown in figures below). For example, space 208A is bounded in opposite circumferential directions CD1 and CD2 by segments 206A and 206B, respectively.

The cross-section shown in FIG. 8, including annular flange 202, annular flange 204, and a ball retention segments 206, is in a shape of an M, as further discussed below. The cross-section shown in FIG. 8 is formed by plane P2 co-linear with section line 8-8, co-linear with axis of rotation AR, and orthogonal to axis of rotation AR.

Each portion 210 includes surface 216 and surface 218. Each portion 212 includes surface 220 and surface 222. Each portion 214 includes surface 224 and surface 226. Surface 216 faces: partly radially outwardly from axis of rotation AR in radially outer direction RD1; and partly in axial direction AD2. Surface 218 faces: partly radially inwardly toward axis of rotation AR in radially inner direction RD2; and partly in axial direction AD1. Surface 220 faces: partly in radially outer direction RD1; and partly in axial direction AD1. Surface 222 faces: partly in radially inner direction RD2; and partly in axial direction AD2.

Surface 224 faces at least partly in radially outer direction RD1 and connects surface 216 and surface 220. Surface 226 faces at least partly in radially inner direction RD2 and connects surface 218 and surface 222. In an example embodiment, thickness 228 of portion 210, thickness 230 of portion 212, and thickness 232 of portion 214 are equal to each other. In an example embodiment, at least part of portions 214 extend past flange 202 and flange 204 in direction RD2. For example, line 3, parallel to axis AR in direction AD1 passes through a portion 214 and is radially inward of flanges 202 and 204.

Each segment 206 includes slot 238: bounded in axial direction AD1 by portion 210; bounded in axial direction AD2 by portion 212; bounded in direction RD2 by middle portion 214; and open in directions RD1, CD1, and CD2. Annular flange 202 and portions 210 are separated by gaps 240 in direction AD2. Portions 212 and annular flange 204 are separated by gaps 242 in direction AD2. Therefore, annular flange 202, gaps 240, portions 210, slots 238, portions 212, gaps 242, and annular flange 204 are sequentially aligned in axial direction AD2. For example, line L4, in direction AD2 passes through in sequence: annular flange 202, gap 240, portion 210, slot 238, portion 212, gap 242, and annular flange 204.

Regarding the M-profile of cage 200 as seen in FIG. 8: annular flange 202 forms one vertical leg; annular flange 204 forms the other vertical leg; portion 210 forms one slanted leg; and portion 212 forms the other slanted leg.

Each portion 210 includes edge 244 and edge 246. Each portion 212 includes edge 248 and edge 250. Each middle portion 214 includes: edge 252 connecting edges 244 and 248; and edge 254 connecting edges 246 and 250. Edge 244 slopes away from annular flange 202 in circumferential direction CD2 along axial direction AD2. Edge 246 slopes away from annular flange 202 in circumferential direction CD1 along axial direction AD2. Edge 248 slopes away from annular flange 204 in circumferential direction CD2 along axial direction AD1. Edge 250 slopes away from annular flange 204 in circumferential direction CD1 along axial direction AD1.

Figure 11:
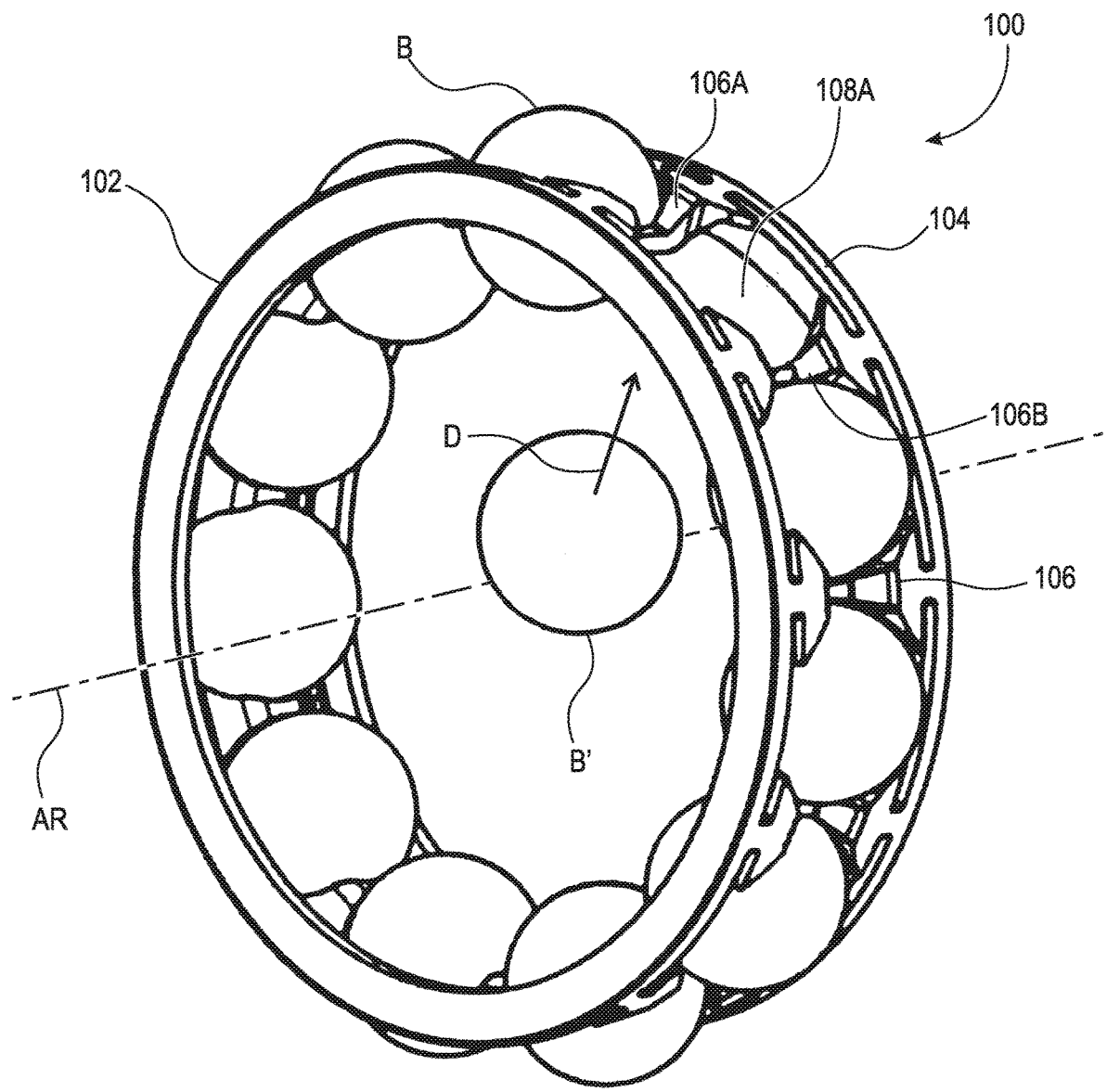
FIG. 11 is an isometric view of the double butterfly cage shown in FIG. 1 with balls.

FIG. 11 is an isometric view of double butterfly cage 100 shown in FIG. 1 with balls B. The following should be viewed in light of FIGS. 1 through 5 and 11. Balls B are loaded into spaces 108 and retained by circumferentially adjacent segments 106. Balls B are loaded radially inwardly into spaces 108. For example a ball B' in FIG. 11 is moved in direction D into space 108A to be retained by segments 106A and 106B. Referencing FIG. 5: outer retention of a particular ball B is provided by contact of balls B with edges 144 and 148 of one segment 106 and edges 146 and 150 of a circumferentially adjacent segment 106; and inner retention of the particular ball is provided by edge 152 of the one segment 106 and edge 154 of the circumferentially adjacent segment 106.

For example, once ball B' is loaded into space 108: outer retention of ball B' is provided by contact of balls B with edges 144 and 148 of segment 106B and edges 146 and 150 of segment 106A; and inner retention of ball B' is provided by edge 152 of segment 106B and edge 154 of segment 106A.

The discussion of FIG. 11 regarding cage 100 and balls B is applicable to cage 200. For example, balls B are loaded into cage 200 and retained by cage 200 as described for cage 100. For example, referencing FIG. 10: outer retention of a particular ball B is provided by contact of balls B with edges 244 and 248 of one segment 206 and edges 246 and 250 of a circumferentially adjacent segment 206; and inner retention of the particular ball is provided by edge 252 of the one segment 206 and edge 254 of the circumferentially adjacent segment 206.

Figure 12:
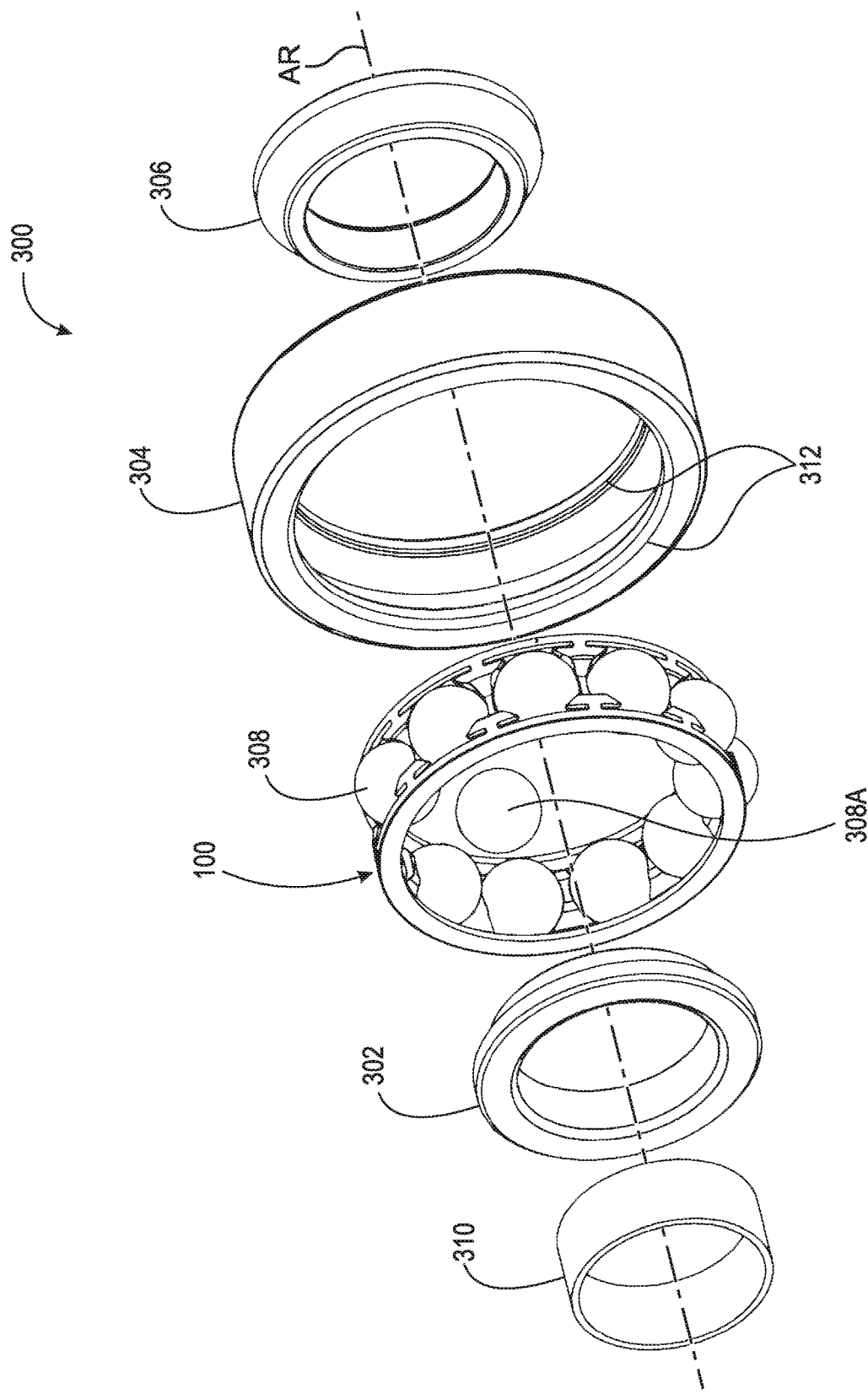
FIG. 12 is an exploded view of a ball bearing including the double butterfly cage shown in FIG. 1.

FIG. 12 is an exploded view of example ball bearing 300 including double butterfly cage 100 shown in FIG. 1. In FIG. 12, ball bearing 300 is a split-ring ball bearing including: cage 100; half inner ring 302; outer ring 304; half inner ring 306; and balls 308. Ball 308A is shown in the pre-loaded position of ball B' in FIG. 11. In the example of FIG. 12, ball bearing 300 is assembled as follows: outer ring 304 is held in place; cage 100 is positioned inside ring 304; balls 308 are loaded into spaces 108; and rings 302 and 306 are slid into position to engage balls 308. To keep balls 308 in place for shipping, retainer 310 is pressed into the inner diameter of rings 302 and 306.

Cage 100 is not limited to use with a split-ring ball bearing. For example, cage 100 can be used in an angular contact ball bearing (not shown).

The discussion for FIG. 12 regarding ball bearing 300 and cage 100 is applicable to cage 200. For example, cage 200 can be used in a split-ring ball bearing or in an angular contact ball bearing.

Figure 13A:
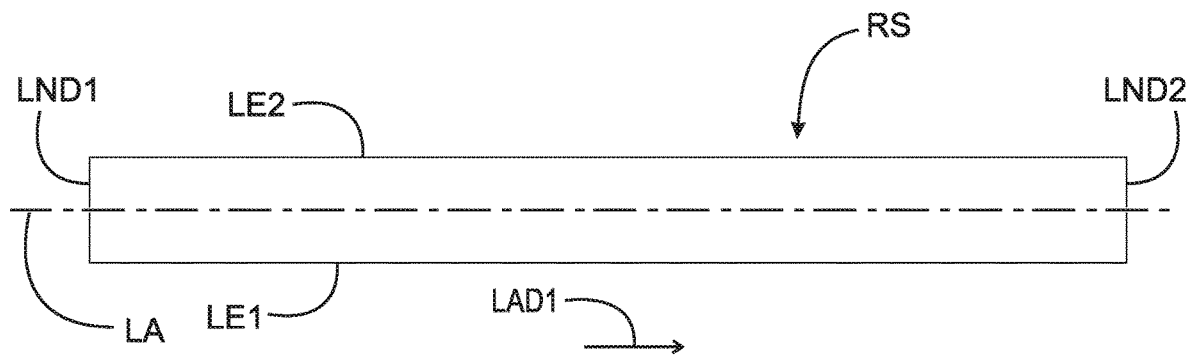
FIG. 13A is a top view of a rectangular strip to be formed into the double butterfly cage shown in FIG. 1.

FIG. 13A is a top view of rectangular strip RS to be formed into double butterfly cage 100 shown in FIG. 1.

Figure 13B:
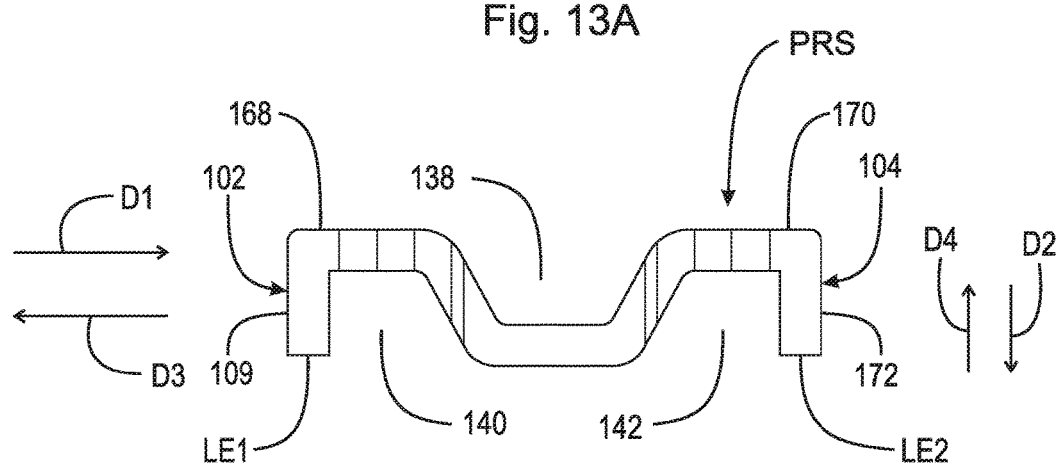
FIG. 13B is an end view of the rectangular strip shown in FIG. 13A after profiling.

FIG. 13B is an end view of rectangular strip RS shown in FIG. 13A after profiling.

Figure 13C:
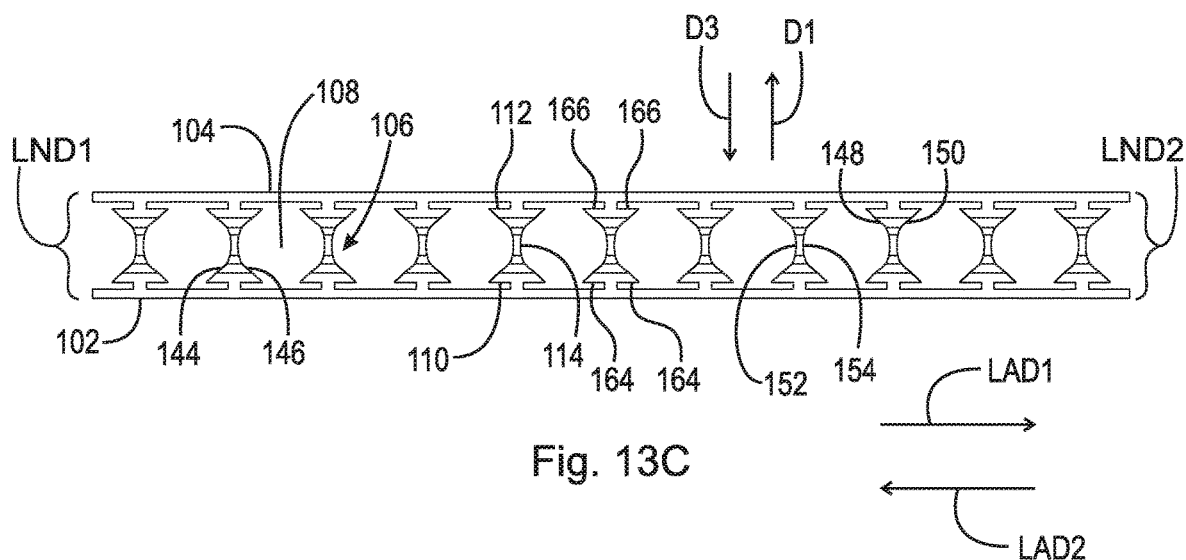
FIG. 13C is a top view of the rectangular strip shown in FIG. 13B after stamping.

FIG. 13C is a top view of rectangular strip RS shown in FIG. 13B after stamping. The following should be viewed in light of FIGS. 1 through 5, and describes a method of fabricating a cage of a ball bearing. Although the method is presented as a sequence of steps for clarity, no order should be inferred from the sequence unless explicitly stated. A first step, shown in FIGS. 13A and 13B, profiles rectangular strip of steel RS to form profiled rectangular strip of steel RS PRS, which in a cross-section, orthogonal to longitudinal axis LA of rectangular strip of steel RS includes: flange 102 parallel to longitudinal axis LA and including longitudinal edge LE1 of rectangular strip of steel RS; flange 104 parallel to longitudinal axis LA and including longitudinal edge LE2 of rectangular strip of steel RS; slot 138 running from longitudinal end LND1 of rectangular strip of steel RS to longitudinal end LND2, opposite end LND1, of rectangular strip of steel RS.

A second step, shown in FIG. 13C, stamps profiled rectangular strip of steel PRS to create retention segments 106 and spaces 108 alternating with retention segments 106 in longitudinal direction LAD1 parallel to longitudinal axis LA. Each retention segment 106 is disposed, in direction D1, orthogonal to longitudinal axis LA, between flange 102 and flange 104 and connects flange 102 and flange 104. A third step rolls stamped profiled rectangular strip of steel PRS into an annular shape to form cage 100, for example as shown in FIGS. 1-5. A fourth step fixedly connects, for example welds, longitudinal end LND1 to the longitudinal end LND2. Example weld points are shown in FIG. 3.

Stamping profiled rectangular strip of steel PRS includes, for each retention segment 106: forming portion 110 directly connected to flange 102 and sloping in direction D2, orthogonal to direction D1, along direction D1; forming portion 112 directly connected to flange 104 and sloping in direction D2 along direction D3, opposite direction D1; forming middle portion 114 connecting portion 110 and portion 112; separating, in direction D1, portion 110 from flange 102 with gap 140; separating, in direction D3, portion 112 from the flange 104 with gap 142; and separating, in direction D1, portion 110 from portion 112 with slot 138.

Stamping profiled rectangular strip of steel PRS includes, for each retention segment 106: forming surface 116 facing partly in direction D1 and facing partly in direction D4, opposite direction D2; forming surface 120, facing partly in direction D3 and facing partly in direction D4; and forming surface 124 facing in direction D4 and connecting surfaces 116 and 120.

Stamping profiled rectangular strip of steel PRS includes, for each retention segment 106: forming surface 118 facing partly in direction D3 and facing partly in direction D2; forming surface 122, facing partly in direction D1 and facing partly in direction D2; and forming surface 126 facing in direction D2 and connecting surfaces 118 and 122. Stamping profiled rectangular strip of steel PRS includes, for each retention segment 106: sequentially aligning in direction D1: flange 102; gap 140, portion 110; slot 138; portion 112; gap 142; and flange 104.

Stamping profiled rectangular strip of steel PRS includes, for each retention segment 106: forming, in portion 110, edge 144 sloping away from flange 102 in direction LAD1 along direction D1; forming, in portion 112, edge 148 sloping away from flange 104 in direction LAD1, along direction D3; forming in portion 114 edge 152 connecting edges 144 and 148; forming, in portion 110, edge 146 sloping away from flange 102 in direction LAD2, opposite direction LAD1, along direction D1; forming, in portion 112, edge 150 sloping away from flange 104 in direction LAD2 along direction D3; and forming in portion 114, edge 154 connecting edges 146 and 150.

Stamping profiled rectangular strip of steel PRS includes, for each retention segment 106: forming portion 110 with thickness 128; forming portion 112 with thickness 130 equal to thickness 128; and forming portion 114 with thickness 132 equal to thickness 128. In an example embodiment, stamping profiled rectangular strip of steel PRS includes creating relief notches 164 and 166. Notches 164 and 166 reduce distortion of cage 100 resulting from rolling stamped profiled rectangular strip of steel PRS into the annular shape.

In an example embodiment after the fourth step, a fifth step grinds some or all of the following: outside diameter surface 168 of flange 102; outside diameter surface 170 of flange 104; surface 109 of flange 102 facing in direction AD1; or surface 172 of flange 104 facing in direction AD2 and forming a portion of cage 100 extending furthest in direction AD2. Grinding surfaces 168 and 170 creates a more circular profile/shape for surface 168 and 170. Grinding surfaces 109 and 172 results in surfaces 109 and 172 being more planar. In an example embodiment after the fourth step, a sixth step heat treats cage 100. In an example embodiment after the fourth step, the fifth step and the sixth step are executed in sequence.

Figure 14A:
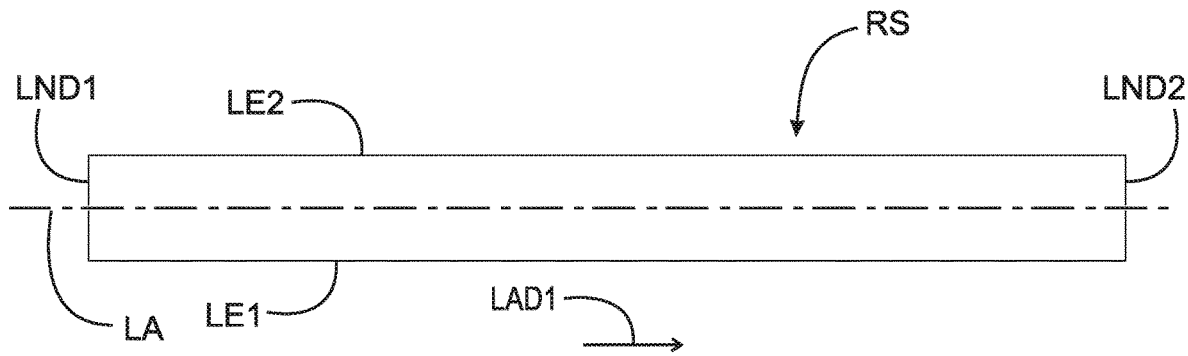
FIG. 14A is a top view of a rectangular strip to be formed into the double butterfly cage shown in FIG. 6.

FIG. 14A is a top view of rectangular strip RS to be formed into double butterfly cage 200 shown in FIG. 6.

Figure 14B:
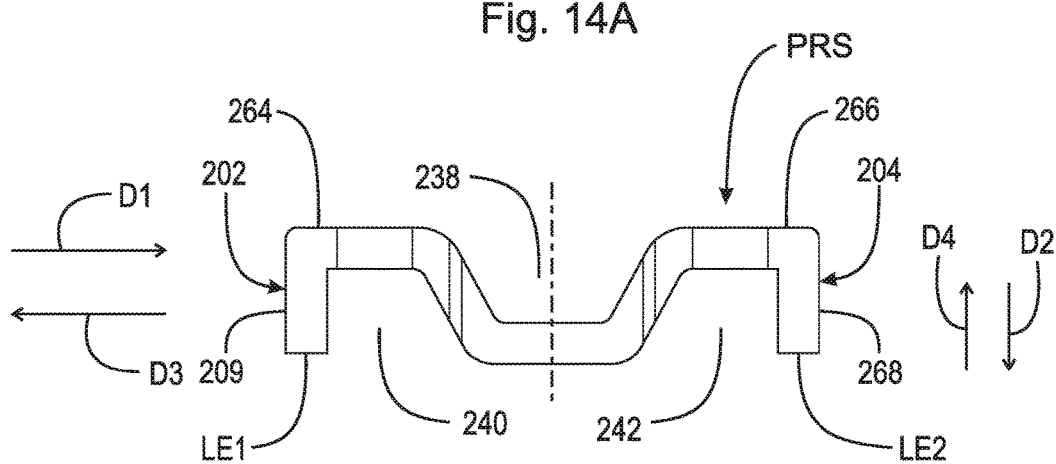
FIG. 14B is an end view of the rectangular strip shown in FIG. 14A after profiling; and, FIG. 14C is a top view of the rectangular strip shown in FIG. 14B after stamping.

FIG. 14B is an end view of rectangular strip RS shown in FIG. 14A after profiling.

Figure 14C:
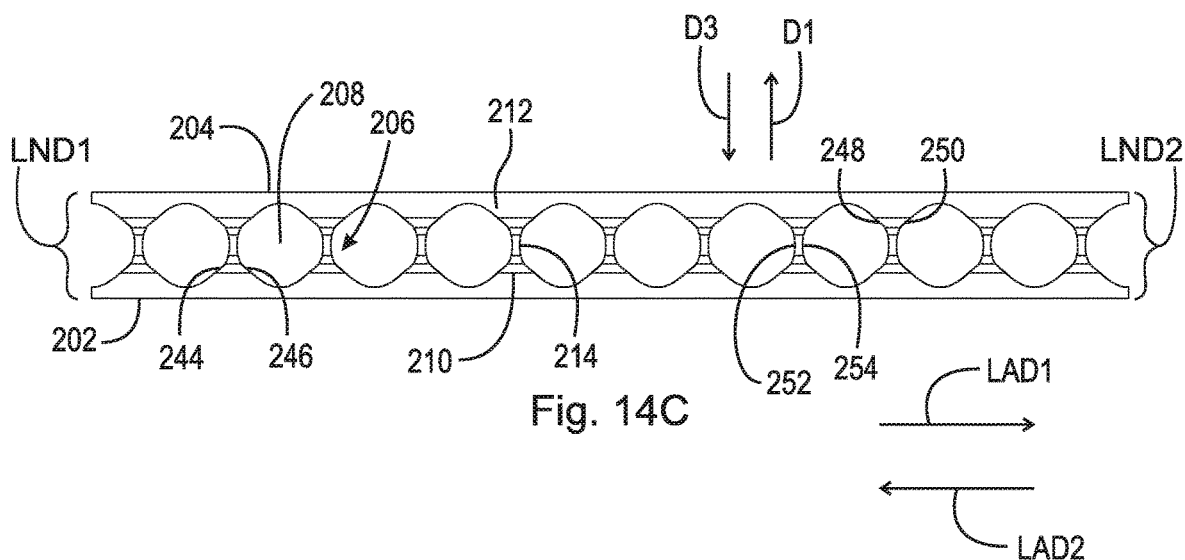

FIG. 14C is a top view of rectangular strip RS shown in FIG. 14B after stamping. The following should be viewed in light of FIGS. 6 through 10, and describes a method of fabricating a cage of a ball bearing. Although the method is presented as a sequence of steps for clarity, no order should be inferred from the sequence unless explicitly stated. A first step, shown in FIGS. 14A and 14B, profiles rectangular strip of steel RS to form profiled rectangular strip of steel RS PRS, which in a cross-section, orthogonal to longitudinal axis LA of rectangular strip of steel RS includes: flange 202 parallel to longitudinal axis LA and including longitudinal edge LE1 of rectangular strip of steel RS; flange 204 parallel to longitudinal axis LA and including longitudinal edge LE2 of rectangular strip of steel RS; slot 238 running from longitudinal end LND1 of rectangular strip of steel RS to longitudinal end LND2, opposite end LND1, of rectangular strip of steel RS.

A second step, shown in FIG. 13C, stamps profiled rectangular strip of steel PRS to create retention segments 206 and spaces 208 alternating with retention segments 206 in longitudinal direction LAD1. Each retention segment 206 is disposed, in direction D1, orthogonal to longitudinal axis LA, between flange 202 and flange 204 and connects flange 202 and flange 204. A third step rolls stamped profiled rectangular strip of steel PRS into an annular shape to form cage 200, for example as shown in FIGS. 6-10. A fourth step fixedly connects, for example welds, longitudinal end LND1 to the longitudinal end LND2. Example weld points are shown in FIG. 8.

Stamping profiled rectangular strip of steel PRS includes, for each retention segment 206: forming portion 210 directly connected to flange 202 and sloping in direction D2, orthogonal to direction D1, along direction D1; forming portion 212 directly connected to flange 204 and sloping in direction D2 along direction D3, opposite direction D1; forming middle portion 214 connecting portion 210 and portion 212; separating, in direction D1, portion 210 from flange 202 with gap 240; separating, in direction D3, portion 212 from the flange 204 with gap 242; and separating, in direction D1, portion 210 from portion 212 with slot 238.

Stamping profiled rectangular strip of steel PRS includes, for each retention segment 206: forming surface 216 facing partly in direction D1 and facing partly in direction D4, opposite direction D2; forming surface 220, facing partly in direction D3 and facing partly in direction D4; and forming surface 224 facing in direction D4 and connecting surfaces 216 and 220.

Stamping profiled rectangular strip of steel PRS includes, for each retention segment 206: forming surface 218 facing partly in direction D3 and facing partly in direction D2; forming surface 222, facing partly in direction D1 and facing partly in direction D2; and forming surface 226 facing in direction D2 and connecting surfaces 218 and 222.

Stamping profiled rectangular strip of steel PRS includes, for each retention segment 206: forming, in portion 210, edge 244 sloping away from flange 202 in direction LAD along direction D1; forming, in portion 212, edge 248 sloping away from flange 204 in direction LAD1, along direction D3; forming in portion 214 edge 252 connecting edges 244 and 248; forming, in portion 210, edge 246 sloping away from flange 202 in direction LAD2, opposite direction LAD1, along direction D1; forming, in portion 212, edge 250 sloping away from flange 204 in direction LAD2 along direction D3; and forming in portion 214, edge 254 connecting edges 246 and 250.

Stamping profiled rectangular strip of steel PRS includes, for each retention segment 206: forming portion 210 with thickness 228; forming portion 212 with thickness 230 equal to thickness 228; and forming portion 214 with thickness 232 equal to thickness 228.

In an example embodiment after the fourth step, a fifth step grinds some or all of the following: outside diameter surface 264 of flange 202; outside diameter surface 266 of flange 204; surface 209 of flange 202 facing in direction AD1; or surface 268 of flange 204 facing in direction AD2 and forming a portion of cage 200 extending furthest in direction AD2. Grinding surfaces 264 and 266 creates a more circular profile/shape for surface 264 and 266. Grinding surfaces 209 and 268 results in surfaces 209 and 268 being more planar. In an example embodiment after the fourth step, a sixth step heat treats cage 200. In an example embodiment after the fourth step, the fifth step and the sixth step are executed in sequence.

The discussion that follows is directed to cage 100; however, it is understood that the discussion is applicable to cage 200. As noted above, it is known to use a riveted cage or plastic cage for ball bearings for high temperature and/or high speed applications. However, riveted cages are relatively costly and plastic cage have limited durability. Cage 100 is cost-effectively fabricated from sheet steel, addressing the cost problem of riveted cages and the durability problem of plastic cages. Cage 100 provides four contact areas (edges 144, 146, 148, and 150) to radially outwardly restrain balls B, and two contact areas (edges 152 and 154) to radially inwardly restrain balls B. In addition, outside diameter surfaces 168 and 170 are typically restrained by a shoulder of a race of a ball bearing including cage 100, for example shoulders 312 of ball bearing 300, which limits performance-limiting radially outward expansion of cage 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
B ball
B' ball
CD1 circumferential direction
CD2 circumferential direction
D direction
D1 direction
D2 direction
D3 direction
D4 direction
L1 line
L2 line
L3 line
L4 line
LA longitudinal axis
LAD1 longitudinal direction
LAD2 longitudinal direction
LE1 longitudinal edge
LE2 longitudinal edge
LND1 longitudinal end
LND2 longitudinal end
P1 plane
P2 plane
PRS profiled RS
RD1 radial direction
RD2 radial direction
RS rectangular strip of steel
100 double butterfly cage
102 annular flange
104 annular flange
106 ball retention segment
108 space
109 surface, flange 102
110 portion, ball retention segment
112 portion, ball retention segment
114 middle portion, ball retention segment
116 surface, portion 110
118 surface, portion 110
120 surface, portion 112
122 surface, portion 112
124 surface, portion 114
126 surface, portion 114
128 thickness, portion 110
130 thickness, portion 112
132 thickness, portion 114
138 slot
140 gap
142 gap
144 edge, portion 110
146 edge, portion 110
148 edge, portion 112
150 edge, portion 112
152 edge, portion 114
154 edge, portion 114
156 surface, portion 110
158 neck, portion 110
160 surface, portion 112
162 neck, portion 112
164 relief notch
166 relief notch
168 outside diameter surface, flange 102
170 outside diameter surface, flange 104
172 surface, flange 104
200 double butterfly cage
202 annular flange
204 annular flange
206 ball retention segment
208 space
209 surface, flange 202
210 portion, ball retention segment
212 portion, ball retention segment
214 middle portion, ball retention segment
216 surface, portion 210
218 surface, portion 210

220 surface, portion 212
222 surface, portion 212
224 surface, portion 214
226 surface, portion 214
228 thickness, portion 210
230 thickness, portion 212
232 thickness, portion 214
238 slot
240 gap
242 gap
244 edge, portion 210
246 edge, portion 210
248 edge, portion 212
250 edge, portion 212
252 edge, portion 214
254 edge, portion 214
264 outside diameter surface, flange 202
266 outside diameter surface, flange 204
268 surface, flange 204
300 ball bearing
302 half inner ring
304 outer ring
306 half inner ring
308 ball
310 retainer
312 shoulder, outer ring

The invention claimed is:

1. A cage for a ball bearing, comprising:
a first annular flange;
a second annular flange;
a plurality of ball retention segments, each ball retention segment including:
a first portion including:
a neck directly fixedly connected to the first annular flange;
a first surface extending from the neck in a first circumferential direction around an axis of rotation of the cage; and,
a first edge extending from the first surface at least partly in a second circumferential direction, opposite the first circumferential direction;
a second portion fixedly connected to the second annular flange; and,
a middle portion connecting the first portion and the second portion; and,
a plurality of spaces, each space circumferentially bounded by a respective pair of circumferentially adjacent ball retention segments, and arranged to receive a ball of the ball bearing, wherein:
a cross-section including the first annular flange, the second annular flange, and a ball retention segment of the plurality of ball retention segments is in a shape of an M; and,
the first annular flange, the first surface, and the neck form a notch open in the first circumferential direction.

2. The cage of claim 1, wherein the cross-section is formed by a plane co-linear with the axis of rotation of the cage, and orthogonal to the axis of rotation.

3. The cage of claim 1, wherein:
the first portion includes a second surface facing partly radially outwardly from the axis of rotation of the cage and facing partly in a first axial direction parallel to the axis of rotation; and,
the second portion includes a first surface facing partly radially outwardly and facing partly in a second axial direction, opposite the first axial direction.

4. The cage of claim 3, wherein:
the first portion includes a third surface facing partly radially inwardly toward the axis of rotation and partly in the second axial direction; and,
the second portion includes a second surface facing partly radially inwardly and partly in the first axial direction.

5. The cage of claim 4, wherein the middle portion includes:
a first surface facing radially outwardly from the axis of rotation and connecting the second surface of the first portion and the first surface of the second portion; and,
a second surface facing radially inwardly toward the axis of rotation and connecting the second surface of the first portion and the second surface of the second portion.

6. The cage of claim 1, wherein:
the first annular flange is continuous in the first circumferential direction and forms a portion of the cage extending furthest in a first axial direction parallel to the axis of rotation of the cage; and
the second annular flange is continuous in the first circumferential direction and forms a portion of the cage extending furthest in a second axial direction, opposite the first axial direction.

7. The cage of claim 1, wherein at least part of the middle portion extends radially inward toward the axis of rotation of the cage and past the first annular flange and the second annular flange.

8. The cage of claim 1, wherein the first portion, the second portion, and the middle portion have a same thickness.

9. The cage of claim 1, further comprising:
for said each ball retention segment, a slot: bounded in a first axial direction by the first portion; bounded in a second axial direction, opposite the first axial direction by the second portion; bounded radially inwardly by the middle portion; and open in a radially outer direction in the first circumferential direction, and in a second circumferential direction, opposite the first circumferential direction.

10. The cage of claim 1, wherein the first annular flange, a first gap, the first portion, a slot, the second portion, a second gap, and the second annular flange are sequentially aligned in an axial direction parallel to the axis of rotation of the cage.

11. The cage of claim 1, wherein:
the first edge of the first portion:
slopes away from the first annular flange in a second circumferential direction, opposite the first circumferential direction, along a first axial direction, parallel to the axis of rotation of the cage; and,
is connected to the middle portion; and,
the second portion includes a first edge:
sloping away from the second annular flange in the first circumferential direction along a second axial direction, opposite the first axial direction; and,
connected to the middle portion.

12. The cage of claim 11, wherein:
the first portion includes a second edge:
sloping away from the first annular flange in the first circumferential direction, along the first axial direction; and,
connected to the middle portion; and,
the second portion includes a second edge:
sloping away from the second annular flange in the second circumferential direction along the second axial direction; and, connected to the middle portion.

13. A cage for a ball bearing, comprising:
a first annular flange forming a portion of the cage extending furthest in a first axial direction parallel to an axis of rotation of the cage;
a second annular flange forming a portion of the cage extending furthest in a second axial direction, opposite the first axial direction; and,
a plurality of ball retention segments, each ball retention segment including:
   a first portion including:
      a neck fixedly connected to the first annular flange;
      a first surface facing in the first axial direction; and,
      a second surface facing partly radially outwardly from the axis of rotation and facing partly in the second axial direction;
   a second portion fixedly connected to the second annular flange and including a surface facing partly radially outwardly from the axis of rotation and facing partly in the first axial direction; and,
   a middle portion connecting the first portion and the second portion and including a surface facing radially outwardly and connecting the first surface of the first portion and the surface of the second portion, wherein:

the first annular flange, the neck, and the first surface of the first portion form a notch open in a first circumferential direction around the axis of rotation of the cage; and, the first annular flange, a first gap, the first portion, a second gap, the second portion, a third gap, and the second annular flange are sequentially aligned in the second axial direction; or, a line, in the second axial direction passes through in sequence the first annular flange, a first gap, the first portion, a second gap, the second portion, a third gap, and the second annular flange.

* * * * *